(12) United States Patent
Nakamura et al.

(10) Patent No.: US 12,546,364 B2
(45) Date of Patent: Feb. 10, 2026

(54) LINEAR MOTION UNIT

(71) Applicant: NIPPON THOMPSON CO., LTD., Tokyo (JP)

(72) Inventors: Tomoaki Nakamura, Mino (JP); Mao Motoyama, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 39 days.

(21) Appl. No.: 18/697,689

(22) PCT Filed: Aug. 5, 2022

(86) PCT No.: PCT/JP2022/030112
§ 371 (c)(1),
(2) Date: Apr. 1, 2024

(87) PCT Pub. No.: WO2023/058316
PCT Pub. Date: Apr. 13, 2023

(65) Prior Publication Data
US 2024/0401640 A1 Dec. 5, 2024

(30) Foreign Application Priority Data
Oct. 5, 2021 (JP) .................................. 2021-164028

(51) Int. Cl.
*F16C 29/06* (2006.01)
*F16C 29/08* (2006.01)
(52) U.S. Cl.
CPC .............. *F16C 29/06* (2013.01); *F16C 29/08* (2013.01)

(58) Field of Classification Search
CPC .............. F16C 29/0609; F16C 29/0611; F16C 29/0633; F16C 29/0635; F16C 29/0638;
(Continued)

(56) References Cited

U.S. PATENT DOCUMENTS 6,241,230 B1  6/2001  Kawaguchi
6,749,057 B2  6/2004  Kato

FOREIGN PATENT DOCUMENTS

DE            19600737 A1 *  7/1997  ......... F16H 25/2418
DE       202010004265 U1 *  8/2010  ......... F16H 25/2418
(Continued)

OTHER PUBLICATIONS

WO2015074533_A1_DESCRIPTION.*
(Continued)

*Primary Examiner* — Phillip A Johnson
(74) *Attorney, Agent, or Firm* — Oliff PLC

(57) ABSTRACT

A linear motion unit includes: a linear motion mechanism including a track member and a moving member; and a housing including a fastener. The fastener includes a first element, a second element meshable with the first element, a first slider, and a second slider located away from the first slider in longitudinal directions. The first slider and the second slider cause the first element and the second element to be separated from each other when the first slider and the second slider move away from each other, and cause the first element and the second element to mesh with each other when the first slider and the second slider move toward each other. The first slider and the second slider are fixable to the moving member.

4 Claims, 9 Drawing Sheets

(58) Field of Classification Search
CPC .......................... F16C 29/064; F16C 29/0642;
F16C 29/0645; F16C 29/0647; F16C
29/0652; F16C 29/0654; F16C 29/0657;
F16C 29/06; F16C 29/59; F16C 29/0661;
F16C 29/0664; F16C 29/068; F16C
29/0683; F16C 29/0685; F16C 29/08
See application file for complete search history.

(56) References Cited

FOREIGN PATENT DOCUMENTS

| | | | |
|---|---|---|---|
| JP | H02-166054 A | 6/1990 | |
| JP | 2000-230618 A | 8/2000 | |
| JP | 2007-069809 A | 3/2007 | |
| JP | 3202894 U | 2/2016 | |
| JP | 2017-109580 A | 6/2017 | |
| WO | 2010/067437 A1 | 6/2010 | |
| WO | 2015/074533 A1 | 5/2015 | |
| WO | 2017/104446 A1 | 6/2017 | |
| WO | WO-2019224998 A1 * | 11/2019 | .............. F16C 29/08 |

OTHER PUBLICATIONS

WO2019224998_A1_DESCRIPTION.*
Jan. 22, 2025 extended Search Report issued in European Patent Application No. 22878187.8.

* cited by examiner

LINEAR MOTION UNIT

TECHNICAL FIELD

The present disclosure relates to a linear motion unit. This application claims priority to Japanese Patent Application No. 2021-164028, which was filed on Oct. 5, 2021, and is incorporated herein by reference in its entirety.

BACKGROUND ART

In a known conventional linear motion unit, a linear motion mechanism is housed in a housing for the purpose of achieving dustproof and waterproof capabilities. A technique of this type is described in Patent Literature 1, for example.

Patent Literature 1 discloses a linear motion unit in which a ball screw as a linear motion mechanism is housed in a housing. In this patent literature, the housing is formed by combining a bottom plate on which the ball screw is disposed, a pair of side plates, and a top plate.

CITATION LIST

Patent Literatures

Patent Literature 1: Japanese Patent Application Laid-Open No. 2000-230618
Patent Literature 2: Japanese Patent Application Laid-Open No. 2007-69809
Patent Literature 3: Japanese Patent Application Laid-Open No. 2017-109580
Patent Literature 4: International Patent Publication No. 2010/067437

SUMMARY OF INVENTION

Technical Problem

The linear motion unit disclosed in Patent Literature 1 needs to disassemble the housing into a plurality of plates to determine a state of the linear motion mechanism in cases such as maintenance and troubles. This causes the problem of complexity of such jobs.

Preferred embodiments of the present disclosure provide a linear motion unit capable of obtaining dustproof capability of a linear motion mechanism and easing maintenance of the linear motion mechanism.

Solution to Problem

A linear motion unit according to the present disclosure includes: a linear motion mechanism including a track member and a moving member, the moving member being linearly movable along longitudinal directions of the track member; and a housing that houses the linear motion mechanism and includes a fastener extending in the longitudinal directions. The track member has a first rolling surface extending in the longitudinal directions. The moving member has a second rolling surface, the second rolling surface being opposed to the first rolling surface and defining a rolling element raceway between the first rolling surface and the second rolling surface. The linear motion mechanism further includes a plurality of rolling elements that circulate in a rolling element circulation path including the rolling element raceway with linear movement of the moving member along the longitudinal directions of the track member. The fastener includes a first element extending in the longitudinal directions, a second element that extends along the first element in the longitudinal directions and is meshable with the first element, a first slider that is attached to the first element and the second element, and a second slider that is attached to the first element and the second element and located away from the first slider in the longitudinal directions. The first slider and the second slider are configured to cause the first element and the second element to be separated from each other when the first slider and the second slider move away from each other, and to cause the first element and the second element to mesh with each other when the first slider and the second slider move toward each other. The first slider and the second slider are fixable to the moving member.

Effects of the Invention

Preferred embodiments of the present disclosure provide a linear motion unit capable of obtaining dustproof capability of a linear motion mechanism and easing maintenance of the linear motion mechanism.

DESCRIPTION OF EMBODIMENTS

Summary of Embodiment

Figure 1:
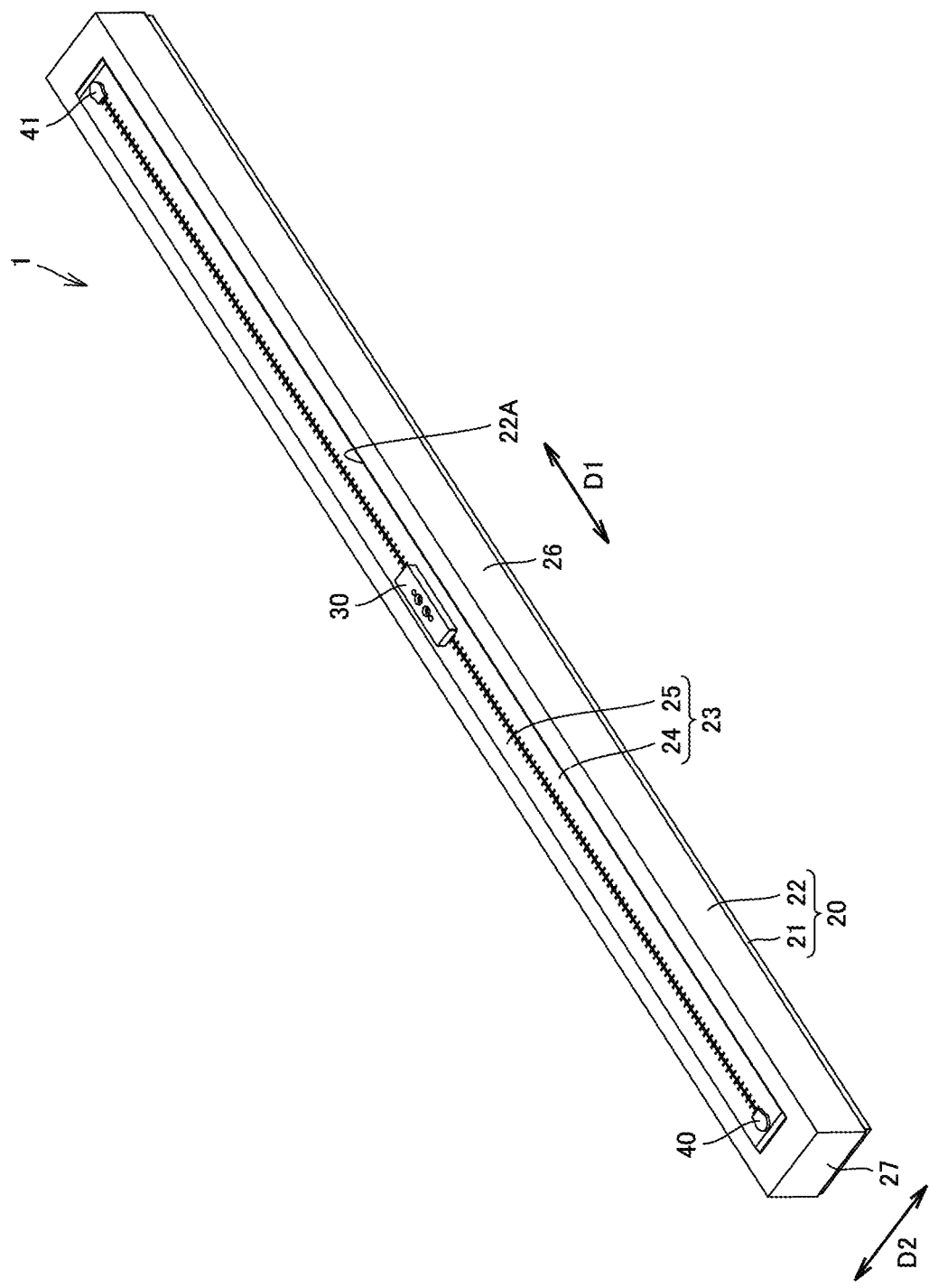
FIG. 1 is a perspective view illustrating an entire configuration of a linear motion unit according to a first embodiment.

A linear motion unit according to the present disclosure includes: a linear motion mechanism including a track member and a moving member linearly movable along longitudinal directions of the track member; and a housing housing the linear motion mechanism and including a fastener extending in the longitudinal directions. The track member has a first rolling surface extending in the longitudinal directions. The moving member has a second rolling surface opposite to the first rolling surface and defining a rolling element raceway between the first rolling surface and the second rolling surface. The linear motion mechanism further includes a plurality of rolling elements that circulate in a rolling element circulation path including the rolling element raceway with linear movement of the moving member along the longitudinal directions of the track member. The fastener includes a first element extending in the longitudinal directions, a second element extending in the longitudinal directions along the first element and meshable with the first element, a first slider that is attached to the first element and the second element, and a second slider that is attached to the first element and the second element and located away from the first slider in the longitudinal directions. The first slider and the second slider are configured to cause the first element and the second element to be separated from each other when the first slider and the second slider move away from each other, and to cause the first element and the second element to mesh with each other when the first slider and the second slider move toward each other. The first slider and the second slider are fixable to the moving member.

In the linear motion unit, when the moving member linearly moves along the longitudinal directions of the track member, a forward slider of the first slider and the second slider causes the first element and the second element to be separated from each other, and a rearward slider of the first slider and the second slider causes the first element and the second element to mesh with each other. Accordingly, while the moving member linearly moves along the longitudinal direction of the track member, a portion of the fastener except for a portion between the first slider and the second slider is kept closed, and thus, dustproof capability of the linear motion mechanism can be achieved. In addition, the fastener can be opened by moving the first slider toward one end of the fastener and moving the second slider toward the other end of the fastener, and thus, maintenance of the linear motion mechanism can be eased.

The "fastener" herein refers to a mechanism in which a plurality of teeth (zipper teeth) are provided along the longitudinal direction at each side, in width directions (direction orthogonal to the longitudinal directions) of a cutout portion (opening) extending in the longitudinal directions.

The linear motion unit may further include a third slider that is attached to a side opposite to the second slider when seen from the first slider and causes the first element and the second element to be separated from each other with movement toward the first slider. With this configuration, without using the first slider and the second slider, the fastener can be opened with the third slider cases such as maintenance of the linear motion mechanism and attachment of the linear motion mechanism to a counter member.

The linear motion unit may further include a fourth slider that is attached to a side opposite to the first slider when seen from the second slider and causes the first element and the second element to be separated from each other with movement toward the second slider. With this configuration, without using the first slider and the second slider, the fastener can be opened with the fourth slider in cases such as maintenance of the linear motion mechanism and attachment of the linear motion mechanism to a counter member.

Specific Examples of Embodiments

Specific embodiments of a linear motion unit according to the present disclosure will now be described with reference to the drawings. In the following drawings, the same or corresponding parts are denoted by the same reference numerals, and the description thereof will not be repeated.

First Embodiment

Figure 2:
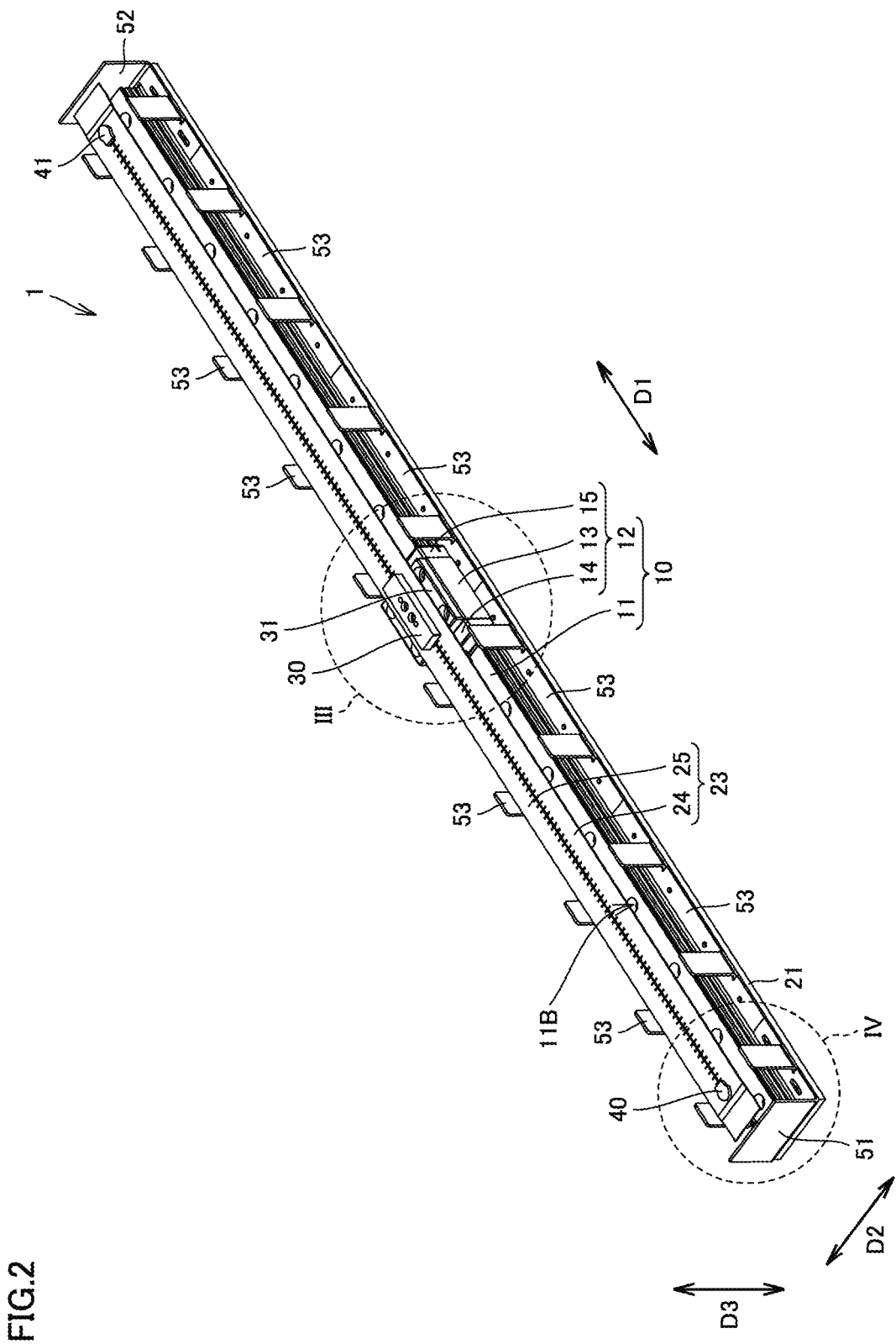
FIG. 2 is a perspective view illustrating a state where a cover is omitted in the linear motion unit according to the first embodiment.
Figure 3:
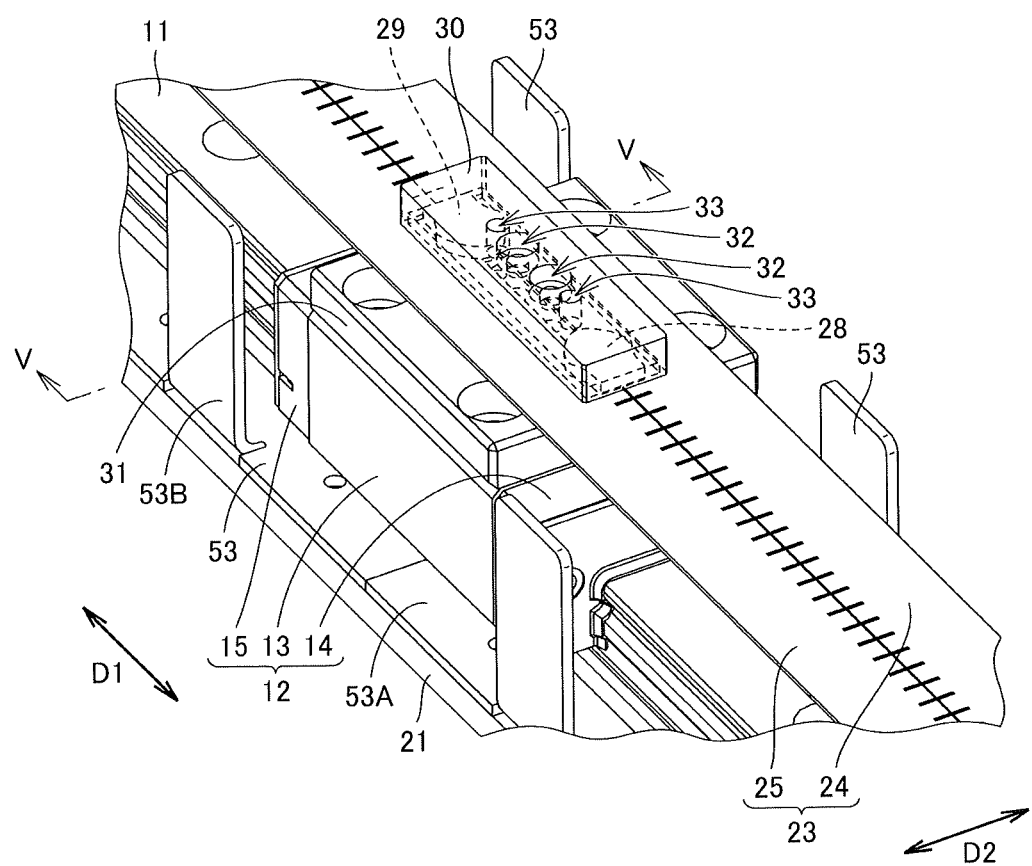
FIG. 3 is an enlarged view of a region III in FIG. 2.
Figure 4:
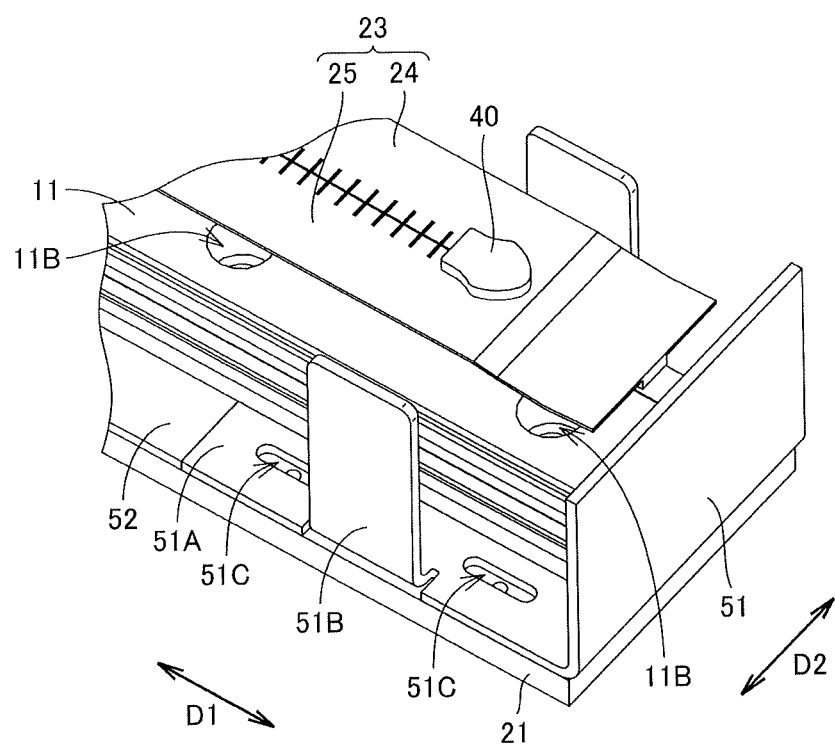
FIG. 4 is an enlarged view of a region IV in FIG. 2.
Figure 5:
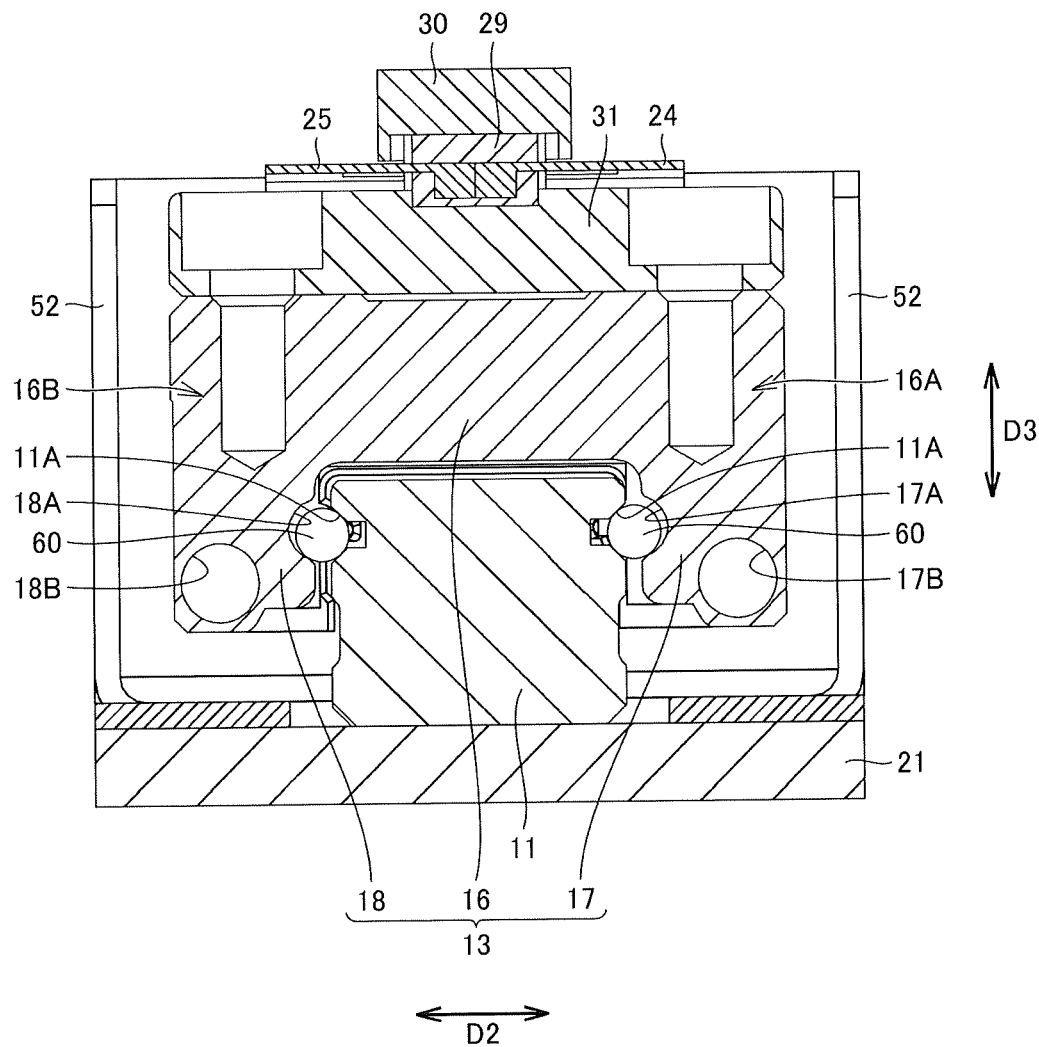
FIG. 5 is a cross-sectional view taken along line V-V in FIG. 3.

First, a configuration of a linear motion unit 1 according to a first embodiment will be described with reference to FIGS. 1 through 5. FIG. 1 is a perspective view illustrating an overall configuration of the linear motion unit 1. FIG. 2 is a perspective view illustrating a state where a cover 22 is omitted in the linear motion unit 1. FIG. 3 is an enlarged view of a region III in FIG. 2. FIG. 4 is an enlarged view of a region IV in FIG. 2. FIG. 5 is a cross-sectional view taken along line V-V in FIG. 3. The linear motion unit 1 mainly includes a linear motion mechanism 10 (FIG. 2) and a housing 20 (FIG. 1) housing the linear motion mechanism 10.

As illustrated in FIG. 2, the linear motion mechanism 10 includes a rail 11 (track member) and a slide block 12 (moving member) that is attached to the rail 11. The rail 11 linearly extends in longitudinal directions D1. The rail 11 has through holes 11B each having a circular shape when seen in the top-bottom directions D3 (perpendicular to both the longitudinal directions D1 and width directions D2) and penetrating the rail 11 in the top-bottom directions D3. The multiple through holes 11B are arranged at regular intervals in the longitudinal directions D1.

The slide block 12 is linearly movable along the longitudinal directions D1 of the rail 11. As illustrated in FIG. 2, the slide block 12 includes a casing 13, and a pair of end caps (a first end cap 14 and a second end cap 15) located at both sides of the casing 13 in the longitudinal directions D1.

As illustrated in FIG. 5, a pair of first rolling surfaces 11A is formed at both sides of the rail 11 in the width directions D2. The first rolling surfaces 11A extend in the longitudinal directions D1 over the entire rail 11. The casing 13 includes a casing body 16 extending in the width directions D2, and a pair of sleeves (a first sleeve 17 and a second sleeve 18) extending in the top-bottom directions D3 from both sides of the casing body 16.

The first sleeve 17 extends in the top-bottom directions D3 from a first end 16A of the casing body 16 toward the rail 11. As illustrated in FIG. 5, the first sleeve 17 has a second rolling surface 17A opposite to the first rolling surface 11A and defining a first rolling element raceway between the first rolling surface 11A and the second rolling surface 17A. The second rolling surface 17A is formed in a portion of the first sleeve 17 facing the rail 11. A plurality of rolling elements 60 (balls in this embodiment) are arranged in the longitudinal directions D1 on the first rolling element raceway. The type of the rolling elements is not limited to balls, and may be, for example, cylindrical rollers.

The second sleeve 18 extends in the top-bottom directions D3 from a second end 16B of the casing body 16 toward the rail 11. The second sleeve 18 has a second rolling surface 18A opposite to the first rolling surface 11A and defining a second rolling element raceway between the first rolling surface 11A and the second rolling surface 18A. The second rolling surface 18A is formed in a portion of the second sleeve 18 facing the rail 11. A plurality of rolling elements 60 (balls in this embodiment) are arranged in the longitudinal directions D1 on the second rolling element raceway.

As illustrated in FIG. 5, the first sleeve 17 has a first return path 17B. The first return path 17B is a through hole extending along the first rolling surface 11A and penetrating the first sleeve 17 in the longitudinal directions D1. More specifically, the first return path 17B is a through hole that is circular when seen in the longitudinal directions D1. In this embodiment, the first return path 17B is separated farther from the first end 16A than from the second rolling surface 17A.

As illustrated in FIG. 5, the second sleeve 18 has a second return path 18B. The second return path 18B is a through hole extending along the first rolling surface 11A and penetrating the second sleeve 18 in the longitudinal directions D1. In this embodiment, the second return path 18B is a through hole that is circular when seen in the longitudinal directions D1. As illustrated in FIG. 5, the second return path 18B is separated farther from the second end 16B than from the second rolling surface 18A.

The first end cap 14 (FIG. 2) incorporates a first direction conversion path (not shown) connecting the first rolling element raceway and the first return path 17B (FIG. 5). The first end cap 14 incorporates a second direction conversion path (not shown) connecting the second rolling element raceway and the second return path 18B (FIG. 5). Similarly, the second end cap 15 (FIG. 2) also incorporates a first direction conversion path connecting the first rolling element raceway and the first return path 17B and a second direction conversion path connecting the second rolling element raceway and the second return path 18B.

Thus, in the slide block 12, an annular first rolling element circulation path is defined by the first rolling element raceway, the first return path 17B (FIG. 5), and the first direction conversion path. In the slide block 12, an annular second rolling element circulation path is defined by the second rolling element raceway, the second return path 18B (FIG. 5), and the second direction conversion path. The slide block 12 includes the first rolling element circulation path and the plurality of rolling elements 60 disposed in the second rolling element circulation path. The rolling elements 60 circulate in the first rolling element circulation path and the second rolling element circulation path with linear movement of the slide block 12 along the longitudinal directions D1 of the rail 11.

As illustrated in FIG. 1, the housing 20 according to this embodiment is a rectangular parallelepiped box extending in the longitudinal directions D1. The housing 20 includes a base plate 21, a cover 22, and a fastener 23.

As illustrated in FIG. 2, the base plate 21 is a rectangular plate extending in the longitudinal directions D1. The linear motion mechanism 10 is disposed on the upper surface of the base plate 21. The housing 20 also includes a first stay 51, a second stay 52, and a plurality of third stays 53. The first stay 51 and the second stay 52 are respectively located at both ends of the upper surface of the base plate 21 in the longitudinal directions D1. The third stays 53 are arranged in the longitudinal directions D1 at ends of the upper surface of the base plate 21 in the width directions D2. That is, the first stay 51, the second stay 52, and the third stays 53 are located on an outer peripheral portion of the upper surface of the base plate 21.

As illustrated in FIG. 3, the third stays 53 include a rectangular third base portion 53A placed on the upper surface of the base plate 21, and a rectangular third wall portion 53B rising perpendicularly to the third base portion 53A. The third base portion 53A has a through hole for fixing the third base portion 53A to the base plate 21. The third wall portion 53B is a portion for supporting the cover 22 (FIG. 1) from the inner side.

As illustrated in FIG. 4, the first stay 51 includes a first base portion 51A placed on the upper surface of the base plate 21, and a rectangular first wall portion 51B rising perpendicularly to the first base portion 51A. The first base portion 51A has a plurality of through holes 51C. As illustrated in FIG. 4, the through holes 51C are long holes each elongated in the longitudinal directions D1. In this manner, since attachment portions of the first stay 51 are long holes, the length of the cover 22 (FIG. 1) in the longitudinal directions D1 is adjusted, and a tension can be exerted to the cover 22. In a manner similar to the third wall portion 53B (FIG. 3), the first wall portion 51B is a portion for supporting cover 22 (FIG. 1) from the inner side. Since the second stay 52 (FIG. 2) has basically the same structure as the first stay 51, detailed description thereof will be omitted.

As illustrated in FIG. 1, the cover 22 has a rectangular parallelepiped outer shape extending in the longitudinal directions D1 and is placed on the base plate 21. The cover 22 includes a pair of first side surfaces 26 each extending in the longitudinal directions D1, and a pair of second side surfaces 27 connecting end portions of the pair of first side surfaces 26 in the longitudinal directions D1. FIG. 1 shows only one of the first side surfaces 26 or the second side surfaces 27. The second side surfaces 27 have a small area than the first side surfaces 26.

The cover 22 is entirely open at the bottom (at the side toward the base plate 21), and the upper surface of the cover 22 has an opening 22A for the fastener 23. As illustrated in FIG. 1, the opening 22A has a rectangular shape smaller than the upper surface of the cover 22 and extending in the longitudinal directions D1. The fastener 23 extends in the longitudinal directions D1 and closes (covers) the entire opening 22A.

As illustrated in FIG. 1, the fastener 23 includes a first element 24, and a second element 25 that can mesh with the first element 24. The first element 24 extends in the longitudinal directions D1 over the entire opening 22A. The second element 25 extends in the longitudinal directions D1 along the first element 24 and has substantially the same length as the first element 24. The first element 24 includes a first tape portion attached along one edge of the opening 22A in the width directions D2, and a plurality of first teeth arranged on the first tape portion in the longitudinal directions. Similarly, the second element 25 includes a second tape portion attached along the other edge of the opening 22A in the width directions D2, and a plurality of second teeth arranged on the second tape portion in the longitudinal directions. The first tape portion and the second tape portion may be omitted so that the first teeth and the second teeth are directly attached to the edges of the opening 22A.

As illustrated in FIG. 3, the fastener 23 includes a first slider 28, and a second slider 29 separated from the first slider 28 in the longitudinal directions D1. In this embodiment, the first slider 28 and the second slider 29 are adjacent to each other in the longitudinal directions D1. The first slider 28 is attached to the first element 24 and the second element 25. The second slider 29 is attached to the first element 24 and the second element 25. In a portion of the fastener 23 located between the first slider 28 and the second slider 29, the first element 24 and the second element 25 are separated from each other.

When the first slider 28 and the second slider 29 move (slide) in the longitudinal directions D1, the separated first and second elements 24 and 25 are thereby caused to mesh with each other, or the first and second elements 24 and 25 meshing with each other are caused to be separated from each other. More specifically, the first slider 28 and the second slider 29 cause the first element 24 and the second element 25 to be separated from each other when the first slider 28 and the second slider 29 move away from each other, whereas the first slider 28 and the second slider 29 cause the first element 24 and the second element 25 to mesh with each other when the first slider 28 and the second slider 29 move toward each other.

The first slider 28 and the second slider 29 are fixable to the slide block 12. The slide block 12 also includes an intermediate plate 31 (FIG. 5) located at the upper surface (surface opposite to the rail 11) of the casing 13 and having substantially the same width as that of the casing 13. The intermediate plate 31 is fixed to the casing 13 by fixing members such as bolts. As illustrated in FIG. 5, the second slider 29 is fixed to the intermediate plate 31. More specifically, a recess depressed toward the casing 13 is formed substantially on a center portion of the upper surface (surface opposite to the casing 13) of the intermediate plate 31 in the width directions D2. A lower portion of the second slider 29 is fitted in the recess.

Accordingly, the second slider 29 is fixed to the slide block 12 (intermediate plate 31 in this embodiment). Although not shown in the cross section of FIG. 5, in a manner similar to the second slider 29, the first slider 28 (FIG. 3) is also fixed to the slide block 12 (intermediate plate 31 in this embodiment). Thus, with linear movement of the slide block 12 on the rail 11, the first slider 28 and the second slider 29 move (slide) in the longitudinal directions D1, and open and close the fastener 23.

As illustrated in FIG. 3, the linear motion unit 1 according to this embodiment further includes a retaining member 30 that retains the first slider 28 and the second slider 29. The retaining member 30 in this embodiment has a rectangular parallelepiped outer shape extending in the longitudinal directions D1, but is not limited to this shape.

As illustrated in FIG. 5, a recess depressing in the direction away from the intermediate plate 31 is formed on the lower surface (surface toward the intermediate plate 31) of the retaining member 30. An upper portion of the second slider 29 is fitted in the recess. Although not shown in FIG. 5, in a manner similar to the second slider 29, an upper portion of the first slider 28 (FIG. 3) is also fitted in the recess formed on the lower surface of the retaining member 30.

As illustrated in FIG. 3, the retaining member 30 has a plurality of (two in this embodiment) first through holes 32 and a plurality of (two in this embodiment) second through holes 33. The first through holes 32 and the second through holes 33 penetrate the retaining member 30 in the top-bottom directions D3, and are aligned in the longitudinal directions D1. More specifically, the first through holes 32 are sandwiched by the second through holes 33 at both sides in the longitudinal directions D1. In this embodiment, the inner diameter of each of the first through holes 32 is larger than the inner diameter of each of the second through holes 33, but the present disclosure is not limited to this example.

As illustrated in FIG. 3, the first through holes 32 and the second through holes 33 are located between the first slider 28 and the second slider 29 in the longitudinal directions D1. Thus, the first through holes 32 and the second through holes 33 overlap a portion of the fastener 23 where the first element 24 and the second element 25 are separated from each other, in the top-bottom directions D3. Accordingly, fixing members (not shown) such as bolts or screws can be inserted in the first through holes 32 and the second through holes 33 to be inserted in holes (not shown) in the intermediate plate 31 through a gap between the first element 24 and the second element 25. In this manner, the retaining member 30 can be fixed to the slide block 12 (intermediate plate 31 in this embodiment).

As illustrated in FIG. 1, the linear motion unit 1 according to this embodiment further includes a third slider 40 and a fourth slider 41. The third slider 40 is attached to a side opposite to the second slider 29 (FIG. 3) when seen from the first slider 28 (FIG. 3). In a state where the fastener 23 is closed between the first slider 28 and the third slider 40, the third slider 40 causes the first element 24 and the second element 25 to be separated from each other with movement toward the first slider 28 (toward the retaining member 30).

Figure 6:
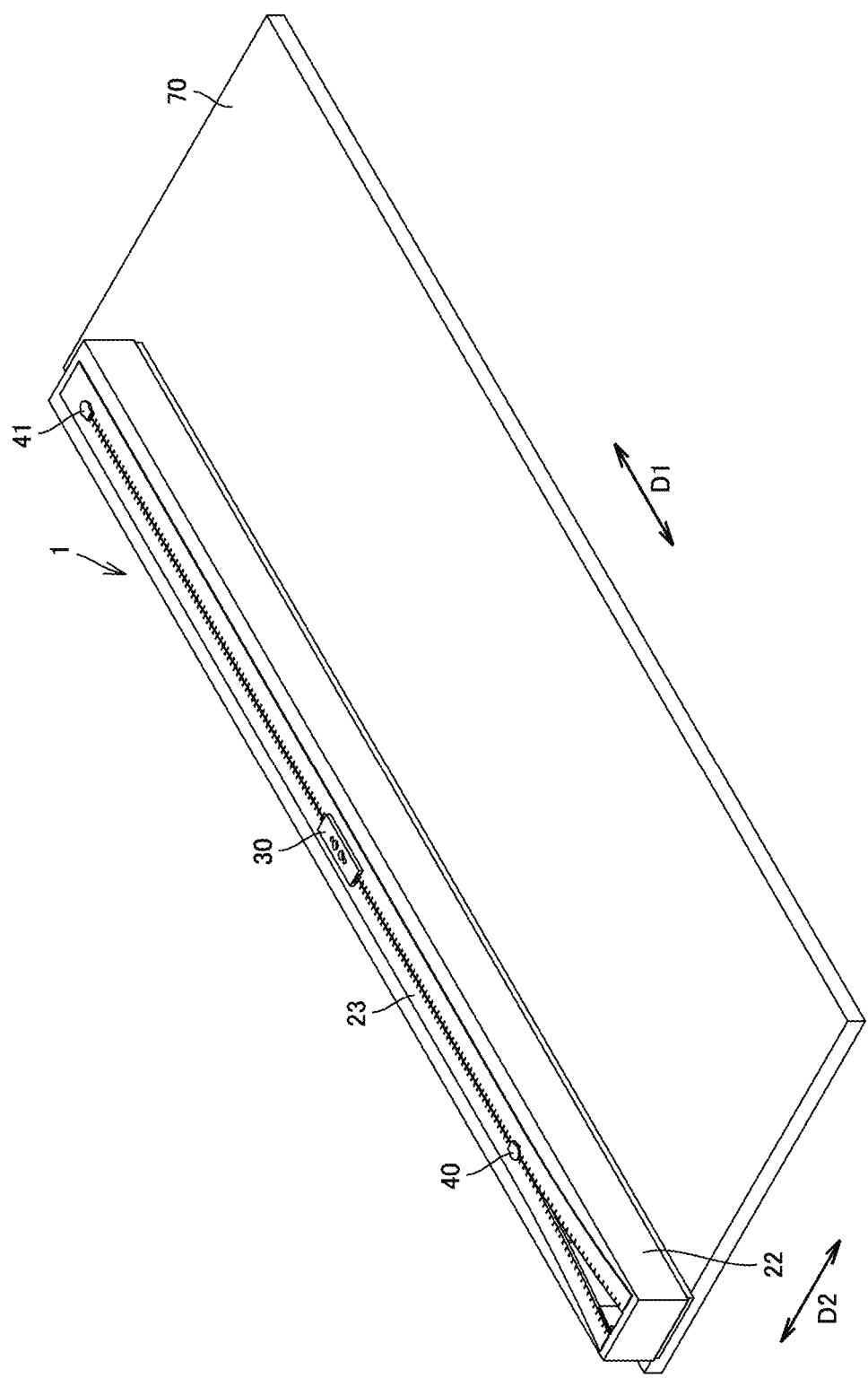
FIG. 6 is a perspective view illustrating a state where the linear motion unit according to the first embodiment is attached to a counter member.
Figure 7:
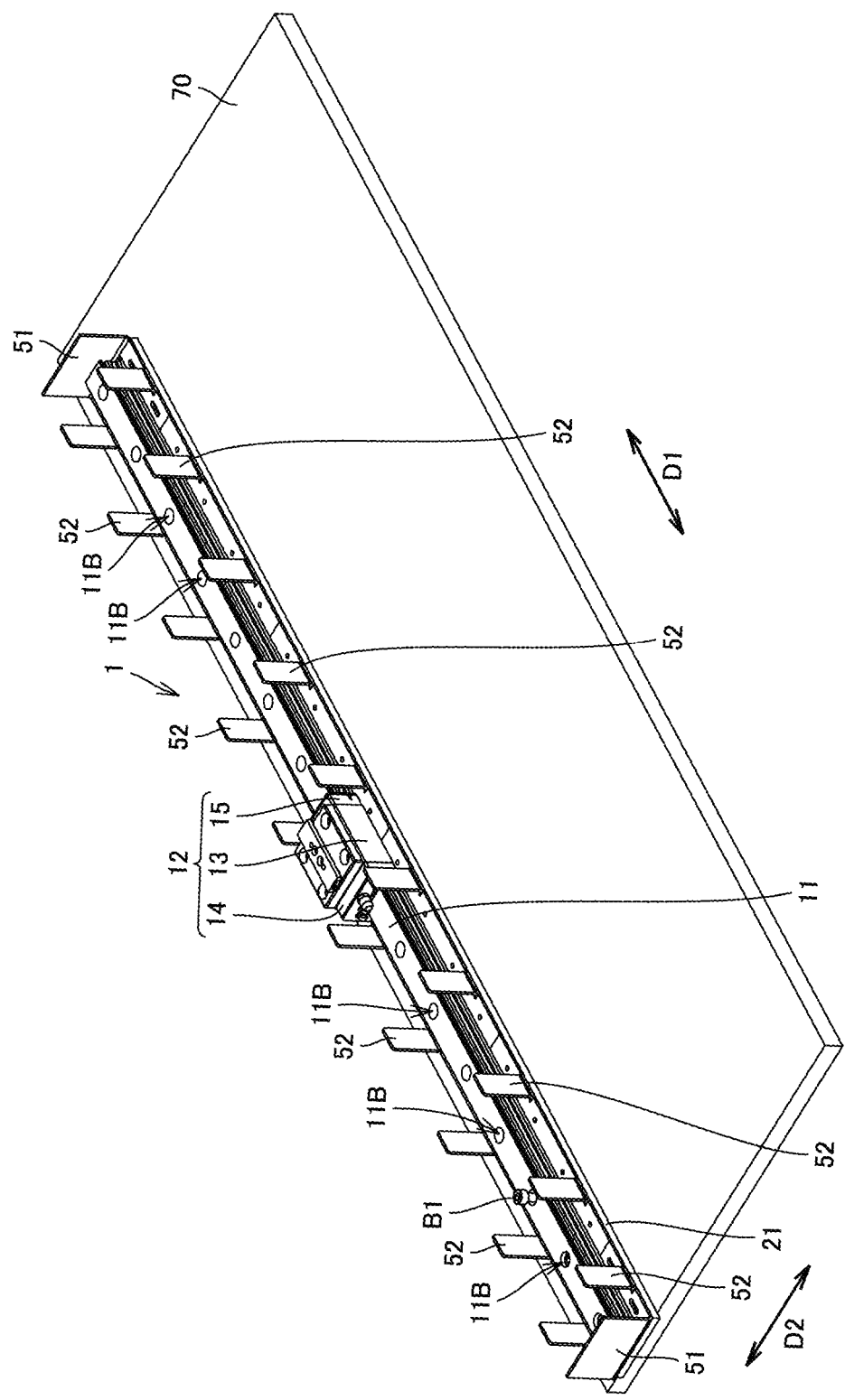
FIG. 7 is a perspective view illustrating a state where the linear motion unit according to the first embodiment is attached to the counter member and the cover is omitted.

Accordingly, as illustrated in FIG. 6, a portion of the fastener 23 is opened by the third slider 40. In this state, as illustrated in FIG. 7, bolts B1 are inserted in the through holes 11B of the rail 11 and through holes (not shown) of the base plate 21 so that the rail 11 can be attached to a counter member 70. In a state where the fastener 23 is partially open, maintenance of the linear motion unit 1, such as determination of the state of raceway surfaces of the rail 11 and the slide block 12, can be performed.

The fourth slider 41 (FIG. 1) is attached to a side opposite to the first slider 28 (FIG. 3) when seen from the second slider 29 (FIG. 3). In a state where the fastener 23 is closed between the second slider 29 and the fourth slider 41, the fourth slider 41 causes the first element 24 and the second element 25 to be separated from each other with movement toward the second slider 29. Accordingly, in a manner similar to the case of using the third slider 40, the fastener 23 can be partially opened, and attachment of the rail 11 and maintenance of the linear motion unit 1 can be performed.

As described above, in the linear motion unit 1 according to this embodiment, when the slide block 12 linearly moves along the longitudinal directions D1 of the rail 11, a forward slider of the first slider 28 and the second slider 29 causes the first element 24 and the second element 25 to be separated from each other, and then, a rearward slider of the first slider 28 and the second slider 29 causes the first element 24 and the second element 25 to mesh with each other. Accordingly, while the slide block 12 linearly moves along the longitudinal directions D1 of the rail 11, the fastener 23 is kept closed, and thus, dustproof capability of the linear motion mechanism 10 can be achieved. In addition, the fastener 23 can be opened by moving the first slider 28 toward one end of the fastener 23 and moving the second slider 29 toward the other end of the fastener 23, and maintenance of the linear motion mechanism 10 can be easily performed.

Second Embodiment

Next, a configuration of a linear motion unit 2 according to a second embodiment will be described with reference to FIGS. 8 and 9. The linear motion unit 2 according to the second embodiment has basically the same configuration and advantages as those of the linear motion unit 1 according to the first embodiment, but is different in that the linear motion mechanism is ball screws. The following description is mainly directed to aspects different from the first embodiment.

Figure 8:
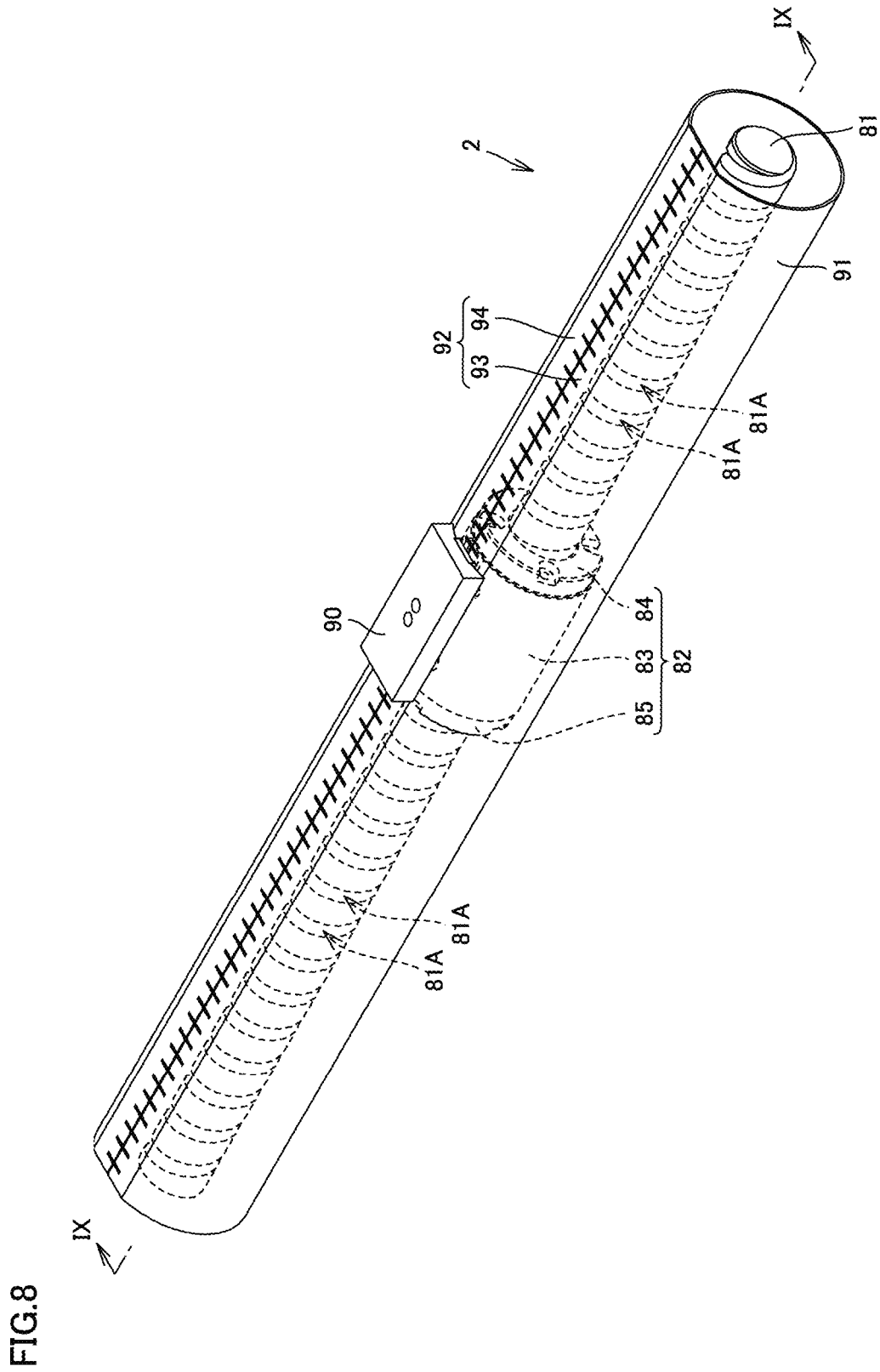
FIG. 8 is a perspective view illustrating a configuration of a linear motion unit according to a second embodiment.

FIG. 8 is a perspective view illustrating a configuration of the linear motion unit 2. FIG. 9 is a cross-sectional view taken along line IX-IX in FIG. 8. As illustrated in FIG. 8, a linear motion mechanism in the second embodiment mainly includes a screw shaft 81 (track member) and a nut 82 (moving member).

The screw shaft 81 has a cylindrical columnar shape, and a helical first screw groove 81A (first rolling surface) is formed on the outer peripheral surface of the screw shaft 81. Both ends of the screw shaft 81 are supported by unillustrated bearings. The nut 82 is linearly movable along the longitudinal directions of the screw shaft 81 with rotation of the screw shaft 81 about an axis. As illustrated in FIG. 8, the nut 82 includes a nut body 83, and a pair of end caps (a first end cap 84 and a second end cap 85) located at both sides of the nut body 83 in the longitudinal directions.

Figure 9:
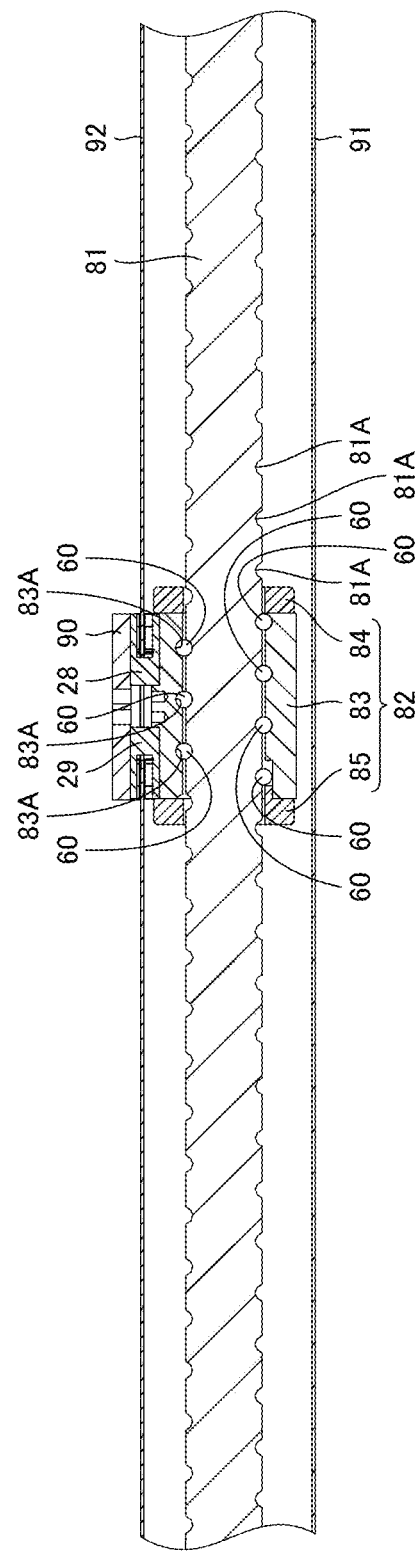
FIG. 9 is a cross-sectional view taken along line IX-IX in FIG. 8.

As illustrated in FIG. 9, the nut body 83 has a cylindrical shape, and a second screw groove 83A (second rolling surface) is formed on the inner peripheral surface of the nut body 83. A rolling element raceway is defined between the first screw groove 81A and the second screw groove 83A, and a plurality of rolling elements 60 (balls) are placed on the rolling element raceway.

As illustrated in FIG. 8, a housing in the second embodiment includes a cover 91 formed by rolling a square sheet, and a fastener 92. A cutout portion (opening) is formed between one end and the other end of the cover 91, and the fastener 92 extends in the longitudinal directions to close (cover) the opening. The fastener 92 includes a first element 93 and a second element 94 that mesh with each other.

As illustrated in FIG. 9, the lower surfaces of a first slider 28 and a second slider 29 are fixed to the outer peripheral surface of the nut body 83. On the other hand, the upper surfaces of the first slider 28 and the second slider 29 are fixed to the lower surface of a retaining member 90. Accordingly, the first slider 28 and the second slider 29 are fixed to the nut 82. Thus, when the nut 82 linearly moves along the screw shaft 81, the first slider 28 and the second slider 29 can move along the longitudinal directions of the screw shaft 81.

Other Embodiments

Other embodiments will now be described.

In the linear motion unit 1 according to the first embodiment, one or both of the third slider 40 and the fourth slider 41 may be omitted. In the linear motion unit 2 according to the second embodiment, one or both of the third slider and the fourth slider may be employed.

In the linear motion unit 1 according to the first embodiment, the first stay 51, the second stay 52, and the third stays 53 may be omitted.

In the linear motion unit 1 according to the first embodiment, the intermediate plate 31 may be omitted. In this case, the first slider 28 and the second slider 29 are directly attached to the casing 13.

In the first embodiment, the case including one rail 11 and one casing 13 is described as an example, but the present disclosure is not limited to this example. For example, two or more casings 13 may be placed for one rail 11, or two rails 11 may be disposed in parallel.

It should be understood that the embodiments disclosed here are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE NUMERALS

1, 2 linear motion unit, 10 linear motion mechanism, 11 rail (track member), 11A first rolling surface, 11B through hole, 12 slide block (moving member), 13 casing, 14, 84 first end cap, 15, 85 second end cap, 16 casing body, 16A first end, 16B second end, 17 first sleeve, 17A second rolling surface, 17B first return path, 18 second sleeve, 18A second rolling surface, 18B second return path, 20 housing, 21 base plate, 22, 91 cover, 22A opening, 23, 92 fastener, 24, 93 first element, 25, 94 second element, 26 first side surface, 27 second side surface, 28 first slider, 29 second slider, 30, 90 retaining member, 31 intermediate plate, 32 first through hole, 33 second through hole, 40 third slider, 41 fourth slider, 51 first stay, 51A first base portion, 51B first wall portion, 51C through hole, 52 second stay, 53 third stay, 53A third base portion, 53B third wall portion, 60 rolling element, 70 counter member, 81 screw shaft, 81A first screw groove (first rolling surface), 82 nut (moving member), 83 nut body, 83A second screw groove (second rolling surface), B1 bolt, D1 longitudinal direction, D2 width directions, D3 top-bottom directions

The invention claimed is:

1. A linear motion unit comprising:
a linear motion mechanism including a track member and a moving member, the moving member being linearly movable along longitudinal directions of the track member; and
a housing that houses the linear motion mechanism and includes a fastener extending in the longitudinal directions,
the track member having a first rolling surface extending in the longitudinal directions,
the moving member having a second rolling surface, the second rolling surface being opposed to the first rolling surface and defining a rolling element raceway between the first rolling surface and the second rolling surface,
the linear motion mechanism further including a plurality of rolling elements that circulate in a rolling element circulation path including the rolling element raceway with linear movement of the moving member along the longitudinal directions of the track member,
the fastener including
a first element extending in the longitudinal directions,
a second element that extends along the first element in the longitudinal directions and is meshable with the first element,
a first slider that is attached to the first element and the second element, and
a second slider that is attached to the first element and the second element and located away from the first slider in the longitudinal directions,
the first slider and the second slider being configured to cause the first element and the second element to be separated from each other when the first slider and the second slider move away from each other, and to cause the first element and the second element to mesh with each other when the first slider and the second slider move toward each other, and
the first slider and the second slider being fixable to the moving member that is housed in the housing.

2. The linear motion unit according to claim 1, further comprising a third slider located at a side opposite to the second slider when seen from the first slider, the third slider being configured to cause the first element and the second element to be separated from each other with movement toward the first slider.

3. The linear motion unit according to claim 2, further comprising a fourth slider located at a side opposite to the first slider when seen from the second slider, the fourth slider being configured to cause the first element and the second element to be separated from each other with movement toward the second slider.

4. The linear motion unit according to claim 1, further comprising a fourth slider located at a side opposite to the first slider when seen from the second slider, the fourth slider being configured to cause the first element and the second element to be separated from each other with movement toward the second slider.

* * * * *